(12) United States Patent
Woodruff et al.

(10) Patent No.: US 8,511,946 B2
(45) Date of Patent: Aug. 20, 2013

(54) STABILIZATION OF BORING TOOLS

(75) Inventors: Douglas J. Woodruff, Atlantic Mine, MI (US); Gary W. Pennala, Calumet, MI (US); William J. Endres, Houghton, MI (US)

(73) Assignee: Rotary Technologies Corporation, Rancho Dominguez, CA (US)

( * ) Notice: Subject to any disclaimer, the term of this patent is extended or adjusted under 35 U.S.C. 154(b) by 60 days.

(21) Appl. No.: 13/218,218

(22) Filed: Aug. 25, 2011

(65) Prior Publication Data

US 2012/0051862 A1   Mar. 1, 2012

Related U.S. Application Data

(60) Provisional application No. 61/377,074, filed on Aug. 25, 2010.

(51) Int. Cl.
*B23B 51/00*   (2006.01)

(52) U.S. Cl.
USPC ............................. 408/83; 408/224; 408/227

(58) Field of Classification Search
USPC .................. 408/83, 223, 224, 227, 233, 705, 408/713
IPC ........................................................ B23B 51/00
See application file for complete search history.

(56) References Cited

U.S. PATENT DOCUMENTS

| | | | | |
|---|---|---|---|---|
| 3,751,177 A * | 8/1973 | Faber | ............................ | 408/200 |
| 4,133,399 A * | 1/1979 | Herrmann | ...................... | 175/384 |
| 5,795,111 A * | 8/1998 | Kress et al. | .................... | 408/224 |
| 5,906,245 A | 5/1999 | Tibbitts et al. | | |
| 6,073,524 A * | 6/2000 | Weiss et al. | ..................... | 82/1.11 |
| 6,135,680 A * | 10/2000 | Szuba et al. | .................. | 408/224 |
| 2004/0134687 A1 | 7/2004 | Radford et al. | | |
| 2006/0045640 A1* | 3/2006 | Hessman | ......................... | 408/81 |
| 2006/0196697 A1 | 9/2006 | Raney | | |
| 2008/0017419 A1* | 1/2008 | Cooley et al. | ................. | 175/286 |
| 2009/0175695 A1* | 7/2009 | Endres et al. | ................. | 407/113 |

FOREIGN PATENT DOCUMENTS

| | | |
|---|---|---|
| DE | 143 046 A1 | 7/1980 |
| EP | 0 874 128 A2 | 10/1998 |
| GB | 2 294 715 A | 5/1996 |
| WO | WO 2009/022145 A1 | 2/2009 |

OTHER PUBLICATIONS

The International Search Report and the Written Opinion mailed Apr. 23, 2012, for International Application No. PCT/US2011/049186, Filed Aug. 25, 2011; 28 Pages.

* cited by examiner

*Primary Examiner* — Eric A. Gates
(74) *Attorney, Agent, or Firm* — Christie, Parker & Hale, LLP (57) ABSTRACT

A boring tool including a body, at least a cutting element mounted to the body, and at least a pad spring mounted to the body.

22 Claims, 10 Drawing Sheets

STABILIZATION OF BORING TOOLS

CROSS-REFERENCE TO RELATED APPLICATION

This application claims the benefit of and priority to U.S. Provisional Application No. 61/377,074, filed on Aug. 25, 2010, the contents of which are fully incorporated herein by reference.

BACKGROUND OF THE INVENTION

U.S. Pat. No. 6,073,524 ("the '524 Patent") and U.S. Pat. No. 6,135,680 ("the '680 Patent") provide good background and context for the present development, the contents of which are fully incorporated herein by reference. The present development pertains to the lateral stabilization of a boring tool as metal cutting element (or elements) carried by the tool enter, traverse, and emerge from a generally circularly cylindrical passage. The passage is defined in a metal work piece and usually is open at its opposite ends. When undergoing the machining process of boring, the diameter of the passage is increased to a specified diameter; the machined passage is then called a "bore." Another effect of the boring process is to cause the surface of the bore to be a machined surface; the surface of the initial passage may not be a machined surface, as the initial work piece can be a casting for an automotive engine block and the boring process is used to form piston cylinders in the block.

The '524 Patent describes a boring tool 8 in which there are three metal cutting elements 10 carried at the "head" or "lead" end 12 of a rotatable tool body 14 (also known as a "bar") at locations spaced substantially equally about the circumference of the tool body. The cutting elements 10 are disclosed to be circular things called "inserts" or "teeth" which are so carried in the tool that they rotate in a self-propelled manner about their central axes in response to forces applied to them as they operate on a work piece to remove metal from the work piece in the course of creating a desired bore. The bore is formed as the tool is rotated about its own axis and is advanced into a work piece passage which is to be machined into a bore. The '680 Patent describes such a boring tool in which the self-propelled rotary inserts are mounted in the tool body to have axial and radial stagger as shown best in FIG. 3 of that patent.

An examination of the cited patents reveals that the boring tool can have substantial length 18 between its lead end 12 and its opposite trailing end 16 where it is configured to be held in a power-driven chuck of a boring machine. The forces applied to the boring tool as its first "lead" cutting element first engages the work piece can cause the lead end of the tool to be deflected laterally, causing a dynamic effect called "chatter." When chatter occurs, the lead cutting element does not form a truly circularly cylindrical surface in the work piece and the surface formed in the work piece may not have a desired dimension or a finish characteristic. The chatter situation described above is "entrance chatter" which occurs as the boring tool enters into machining engagement with a work piece.

Chatter can continue to occur as the second ("intermediate" or "mid") cutting element advances into contact with the work piece, with similar results. Chatter effects can increase as the third ("finish") cutting element advances into contact with the work piece.

A similar chatter situation called "exit chatter" can occur as a boring tool advances to move the lead cutting element, and then the intermediate cutting element beyond the far or exit end of the bore. Further, chatter can occur when all cutting elements are operating on the work piece. Once chatter begins to occur, it can continue throughout the boring process.

It is rare that a machined surface created under chatter conditions meets acceptable finish and dimensional requirements. Furthermore, dynamic chatter effects impose shock-like high-frequency cyclic loads upon the boring tool, notably on the cutting elements and the structures which mount them to the tool body, as well as (to a more attenuated extent) upon the boring machine itself. Such chatter effect loads reduce the useful lives of the things on which they are imposed, and so, they are to be avoided, minimized, and reduced in duration and magnitude to the greatest extent possible.

SUMMARY OF THE INVENTION

In an exemplary embodiment, a boring tool is provided including a body, a cutting element mounted on the body, and a pad spring mounted to the body. In another exemplary embodiment, the pad includes a first section including a bull nose outer surface, a second section adjacent to the first section, and a third section adjacent the second section. The third section includes an outer surface that extends radially beyond the first section and the second section has an outer surface defining a transition from the first section to the third section outer surface. In a further exemplary embodiment, during boring with the boring tool, a lead-tooth cut profile is defined on an object being bored by the tool having a first maximum diameter, an intermediate-tooth cut profile is defined on such object adjacent to the lead-tooth cut profile and having a second maximum diameter which is greater than or equal to the first maximum diameter, and a finish-tooth cut profile is defined on such object adjacent the intermediate-tooth cut profile and having a third maximum diameter which is greater than or equal to the second maximum diameter. The finish-tooth cut profile is adjacent to a finished bored section having the third maximum diameter, and such third section outer surface is for engaging the finished bored section causing a gap to form between the bull nose outer surface and the lead-tooth cut profile. In yet another exemplary embodiment, a bore penetrates through the entire second section. In yet a further exemplary embodiment, the boring tool includes at least three cutting elements and at least three pads, each pad being spring mounted to the body. In one exemplary embodiment, the boring tool includes a shim, a beam mounted on the body and over the shim, such that a portion of the beam extends beyond the shim defining a gap with the body such that the beam acts as a cantilever spring beam and the pad is mounted on the beam. In an exemplary embodiment, the beam is made of spring steel. In another exemplary embodiment, the beam is mounted in a cut-out formed on the body. In a further exemplary embodiment, the tool includes a spring pack, a support body, and a fastener connected through the support body and being fastened to the tool body. The fastener penetrates the spring pack, and the pad is mounted on the support body. In one exemplary embodiment, the spring pack comprises a plurality of belleville washers. In another exemplary embodiment, the support body includes at least one seat and at least one fastener, and the pad is seated on the at least one seat and is urged in place against the at least one seat by the at least one fastener.

In yet another exemplary embodiment, a boring tool is provided including a body, a cutting element mounted on the body, and a pad mounted to the body. The pad includes a first section having a bull nose outer surface, a second section adjacent the first section, and a third section adjacent the second section. The third section includes an outer surface that extends radially beyond the first section and the second section has an outer surface defining a transition from the first section to the third section outer surface. In yet another exemplary embodiment, a bore penetrates through the entire second section. In yet a further exemplary embodiment, during boring with the boring tool, a lead-tooth cut profile is defined on an object being bored by the tool having a first maximum diameter, an intermediate-tooth cut profile is defined on such object adjacent to the lead-tooth cut profile and having a second maximum diameter which is greater than or equal to the first maximum diameter, and a finish-tooth cut profile is defined on such object adjacent the intermediate-tooth cut profile and having a third maximum diameter which is greater than or equal to the second maximum diameter. The finish-tooth cut profile is adjacent to a finished bored section having the third maximum diameter, and such third section outer surface is for engaging the finished bored section causing a gap to form between the bull nose outer surface and the lead-tooth cut profile.

DETAILED DESCRIPTION

The foregoing is an introduction to the following description of structures and procedures useful to positionally stabilize a boring tool as cutting elements on the tool move into, through, and out of cutting engagement with a work piece. Such stabilization of the tool significantly and beneficially addresses the problems of chatter, including entrance chatter and exit chatter in boring tools. In general the boring bar may have one or more teeth. The teeth may be staggered axially and/or radially relative to each other or may not be staggered at all. In the case of staggered teeth, the last tooth may be referred to as the "finish" tooth; the first tooth is referred to as the "lead" tooth, and any teeth in between are referred to as the "intermediate" teeth. More generally, when there are four or more teeth in multiples of two, three, four, etc., the teeth may be staggered in "tooth-sets" where, for instance on a four-tooth boring bar, the first tooth and second tooth are staggered relative to one another, the second tooth following the first tooth in rotation, and then the third tooth and fourth tooth are staggered in the same way with the first tooth and third tooth cutting at the same radial and axial positions as each other and the second tooth and fourth tooth cutting at the same axial and radial positions as each other but, due to the staggering, at different axial and radial positions as are the first tooth and third tooth. In this case, the second tooth and fourth tooth are both "finish" teeth in that they are each the last tooth of their respective tooth set.

The pads, preferably in number equal to the number of teeth but generally no less than three, are carried in the tool body at equally spaced locations on a common circumference of the tool body. The pads are positioned so that they are in the shadow of the cutting elements of the boring tool. A tool having three staggered teeth is used by way of example to illustrate the present invention. In such case the third tooth is the finish tooth. However, in another exemplary embodiment, the boring tool may have more than one teeth which may or not be staggered (axially and/or radially) relative to each other.

The following text describes the pads as elements which are stiffly sprung and move only radially relative to the tool body. The function of those pads can be performed by radially biased rollers which have profiles like those of the disclosed pads and so cooperate effectively with the contour of the surface created by the boring tool in the work piece.

Figure 3:
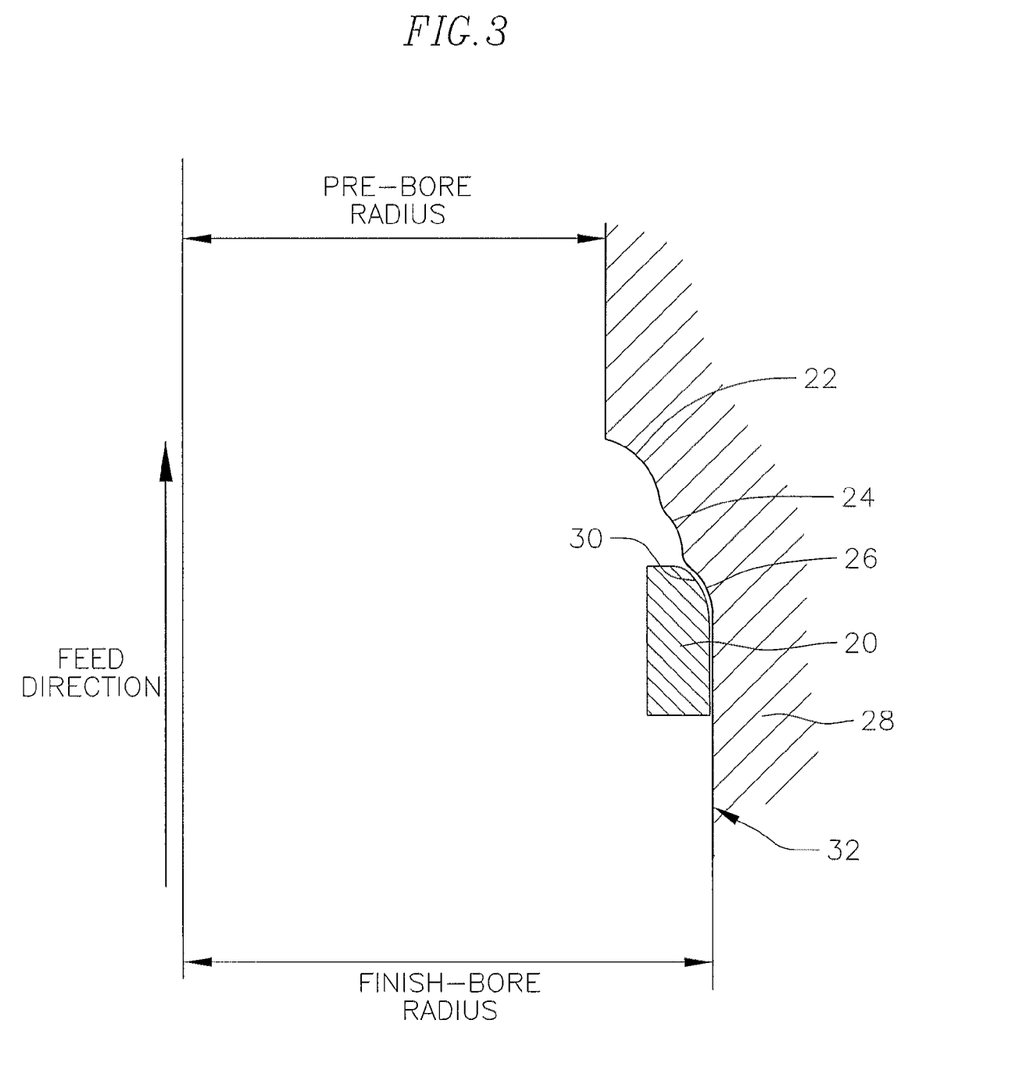
FIG. 3 is a schematic view depicting an exemplary embodiment pad of an exemplary embodiment boring tool of the present invention in relation to a bore opening being formed by such tool in a work piece.

In one exemplary embodiment, to overcome the problem of chatter, spring loaded pads 20 are incorporated on the bar to promote stability in a staggered three-tooth bar. A three-tooth bar is a bar incorporating three cutting elements or teeth 10. As shown in FIG. 3, with this embodiment, the pads are incorporated in relation to a lead-tooth cut profile 22, an intermediate-tooth cut profile 24 and a finish-tooth cut profile 26 cut on a cylindrical work piece 28. Each pad 20 has a bull nose 30 that allows the pad to ride in the curvature cut by the finish-tooth, i.e., the curvature of the finish-tooth cut profile 26. With this embodiment, applicant discovered that with proper shimming to achieve slight preload of the spring-mounted pad as will be described herein, excellent results were provided while the boring bar was fully engaged (all three teeth) in the cylindrical work piece 28 and the pads were in contact with the cylinder wall 32. While at this position, the pads worked well for alleviating chatter in the actual boring and bore exiting (opposite end from where the bore starts), catastrophic chatter when operating at rotational speeds greater than 100 RPM developed before the pads would engage the cylinder wall as the lead tooth began cutting while the bar first entered the cylinder.

Figure 4:
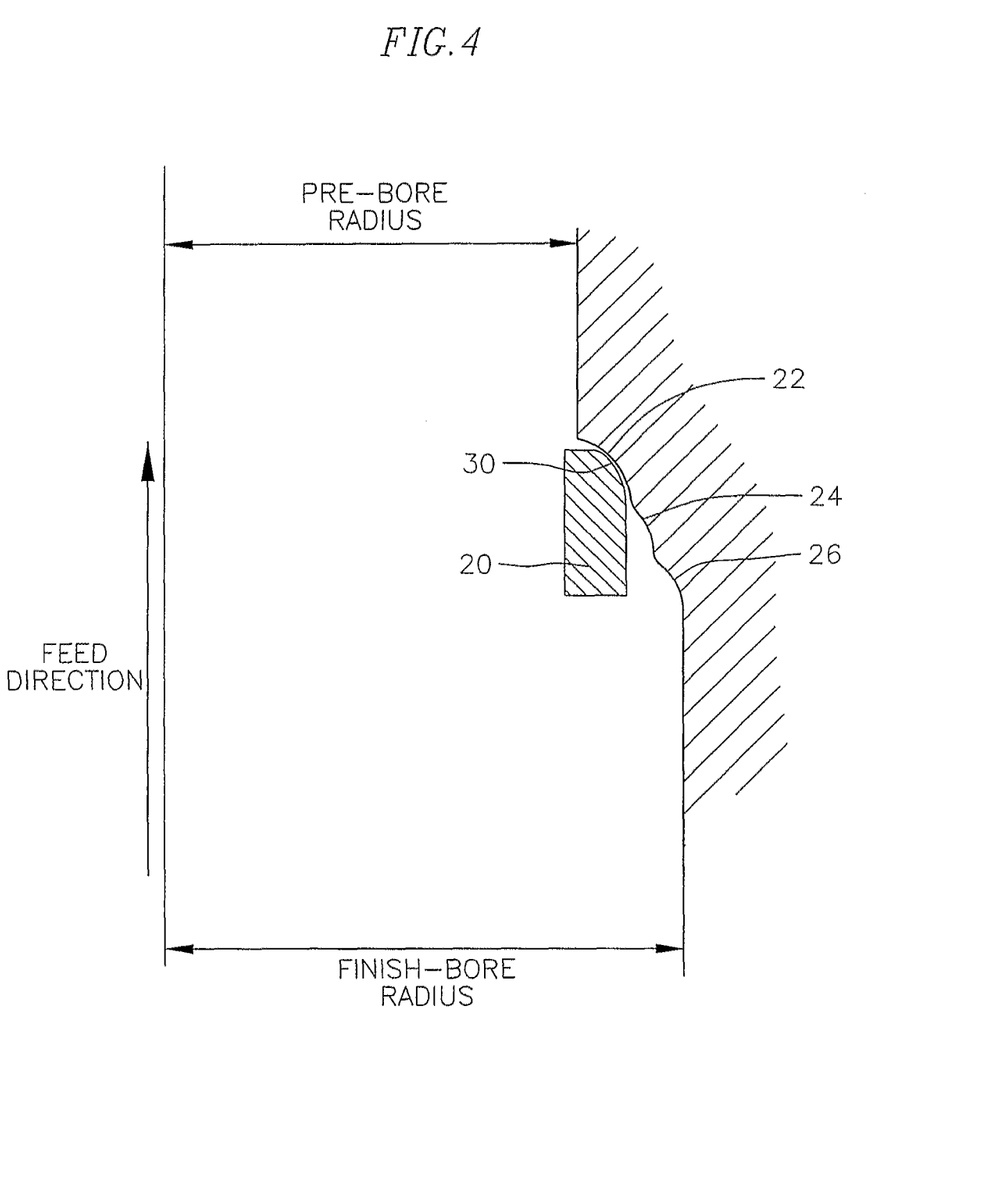
FIG. 4 is a schematic view of another exemplary embodiment pad of an exemplary embodiment boring tool of the present invention in relation to a bore opening being formed by such tool in a work piece.

Applicant discovered that if the pads were located so as to have the bull nose 30 ride in the lead-tooth cut profile 22, as shown in FIG. 4 the bar entered and ran the length of the bore without chatter. This embodiment provided for an easy fix to the problem of the embodiment shown in FIG. 3. With this embodiment, applicant discovered that while the pads worked for bore entry and running the length of the bore, the support would be lost once the boring bar lead tooth exits a cylinder and severe chatter would therefore ensue. In addition, the amount of surface area for the pads to ride on is very limited (i.e., the rather small bull nose 30 of each pad rides against the lead-tooth cut profile for the entire length of the bore), thus increasing the force per area and significantly accelerating wear tendencies of the pads.

Figure 5:
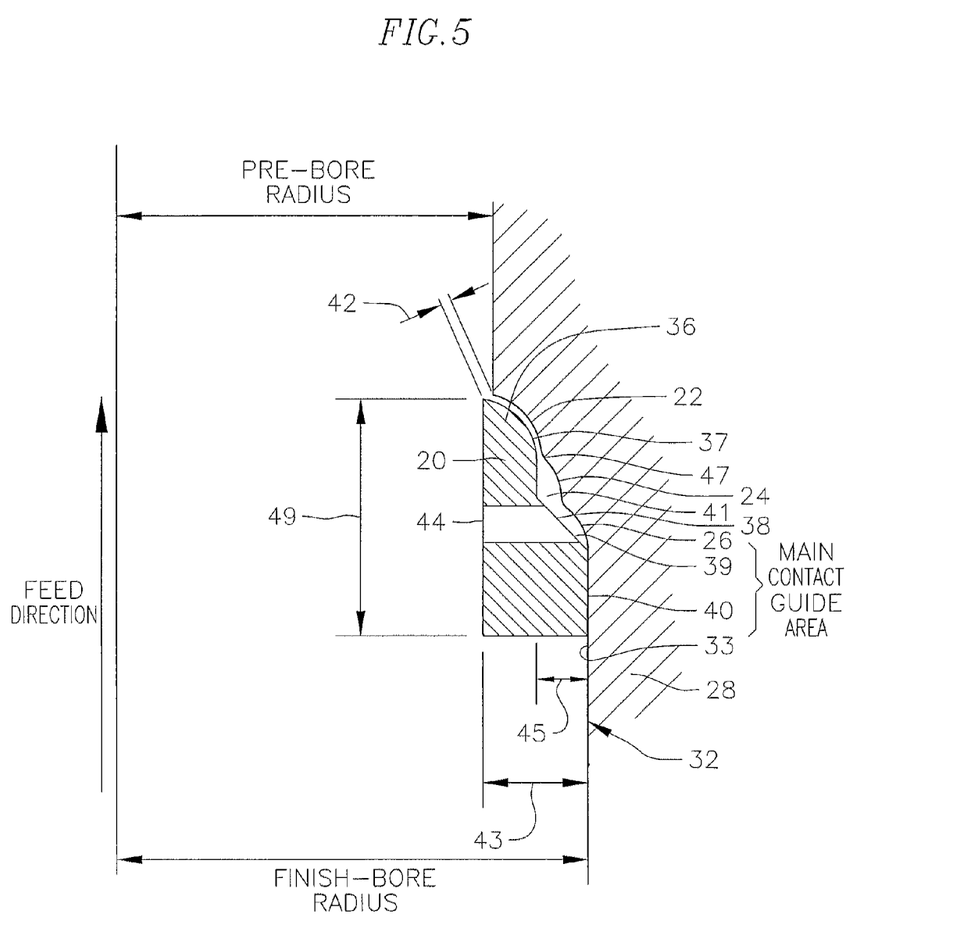
FIG. 5 is a schematic view of yet another exemplary embodiment pad of an exemplary embodiment boring tool of the present invention in relation to a bore opening being formed by such tool in a work piece.

In a further exemplary embodiment as shown in FIG. 5, applicant was able to address all the concerns of entry, exit, and general wear. The pad 20 itself is made slightly longer than the original design and incorporates a bull nose leading edge 36 having a bull nose shaped surface 37, trailed by a "transition" portion 38 having a surface 39 which is trailed by main contact portion 40. The fundamental design works the same as what has been tested with specific spring stacks and spring beams as will be described herein so the pad can compress into the boring bar and account for a certain amount of pad wear while maintaining intimate contact with the surfaces of the bore wall. This embodiment provides a "dual stage" engagement process. Moreover, an open space area 41 is defined between the transition surface and the intermediate-tooth cut profile 24 and the finish-tooth cut profile 26.

The first stage of engagement is between the leading bull nose surface 37 of the pads and the lead-tooth cut profile 22 immediately as the boring bar enters a fresh cylindrical work piece 28. As these two surfaces come into contact, the pad will compress a spring (or spring system) approximately 0.002 inch against the bar and provide positive support to the boring bar, preventing chatter as the lead and intermediate teeth engage in the cut. The second stage occurs as the main contact portion surface 40 of the pad comes into contact with a bore finish surface 33 of the cylindrical wall 32 just as the finish tooth is fully engaged. The main contact portion surface 40 of the pad is positioned radially outward relative to the bull nose surface 37 such that engaging the main contact portion surface with the cylinder wall 32 finish surface 33 causes the pad to further compress the noted spring system relative to the bar, possibly an additional 0.001 inch (or perhaps a little more), developing a gap 42 between the bull nose surface 37 of the pad and the lead-tooth cut profile 22. This means that the bull nose contact lasts only a very small fraction of the overall boring time for each bore so that the majority of the pad contact is borne by the main contact portion surface 40, which in the shown exemplary embodiment, is much larger and as such results in a reduced overall pad wear rate.

In an exemplary embodiment, the maximum thickness 43 of the pad occurs in the main contact portion and is about 2 mm (FIG. 5). In the shown exemplary embodiment, the distance 45 between the end 47 of the bull nose surface and the main contact portion outer surface is typically no greater than 1 mm and often less than 1 mm. The overall height 49 of the exemplary embodiment pad is about 12 mm. The main contact portion 40 has a radius of curvature, measured in a plane to which the boring bar axis is normal, that is slightly less than the radius of the finished bore so that the circumferentially leading edge of the pad does not cut into the bore wall. Furthermore, the circumferentially leading 90 (and trailing 92) edges (FIG. 8) may have a small chamfer or round so that the leading edge of the pad will not catch on the bore wall in situations where the bore wall has voids (holes, slots, etc.), in which case a pad may momentarily spring outward when circumferentially disengaging the bore wall upon entry to the void (no bore-wall contact) and be re-compressed upon circumferentially exiting the void to re-engage the bore wall. The pads are positioned axially such that the bull nose of each pad is set back axially from the axial position of the lead-tooth cut profile, as measured at the angle of the lead tooth 11, by a distance 51 (FIG. 8) that is equal to a fraction of the axial bar feed per tooth-set, that fraction being equal to its angular distance behind the lead tooth in its respective tooth-set, measured in degrees, divided by the quantity of 360° divided by the number of tooth sets. It should be noted that a "tooth set" may include one or more teeth.

In one exemplary embodiment, the open space 41 defined between the transition surface 39 and the intermediate- and finish-cut tooth profiles is adjacent to a coolant delivery passage 44. This passage allows through spindle coolant (i.e., coolant that is routed through the tool body) to be routed to the pad through the coolant delivery passage 44 and into the open space 41 to provide direct and localized cooling and lubrication to the pad. In embodiments where flood cooling is utilized, the open space 41 provides for better penetration of coolant from remote flood application nozzles.

Exemplary pads are made out of hardened tool steel, carbide or other materials which are typically used for making metal cutting elements or teeth. The pads may also be CVD, PVD or thermal diffusion coated with typical coating materials, preferably ones that promote low friction and low tendency for adhesion, such as, but not limited to, TiN, TiC, TiAlN, or $MoS_2$.

In an exemplary embodiment, one pad is mounted on the bar 14 for every cutting tooth 10 mounted on such bar. For example, if three cutting teeth are mounted on the bar, then three pads are also mounted on the bar. In one exemplary embodiment, a pad is mounted between each pair of adjacent teeth. In another exemplary embodiment, a pad is mounted opposite each tooth. In yet a further exemplary embodiment, more or less than one pad per cutting tooth may be mounted on the bar. For example, in an embodiment where six cutting teeth are mounted on the bar, only three pads may be mounted on the bar. Generally, no less than three pads would be used in that three points define a circle.

Figure 6:
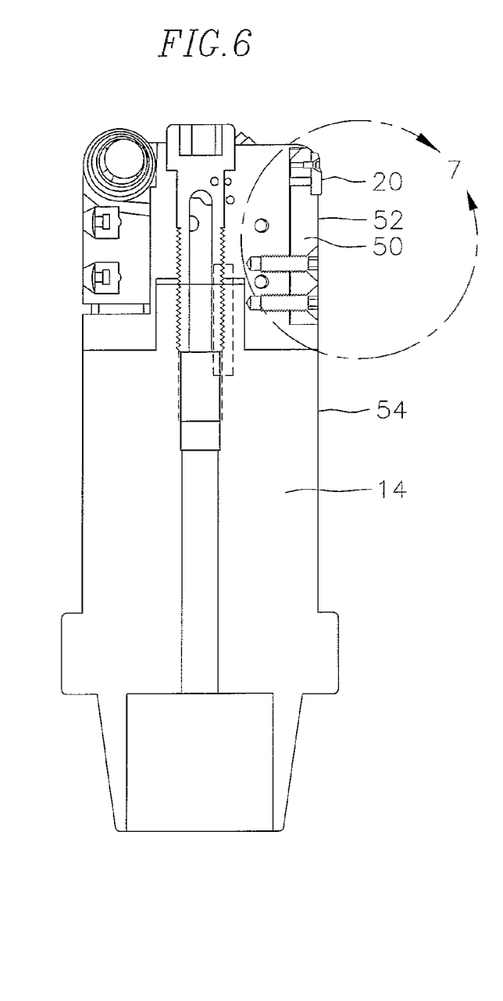
FIG. 6 is a cross-sectional view of an exemplary embodiment boring tool of the present invention.
Figure 7:
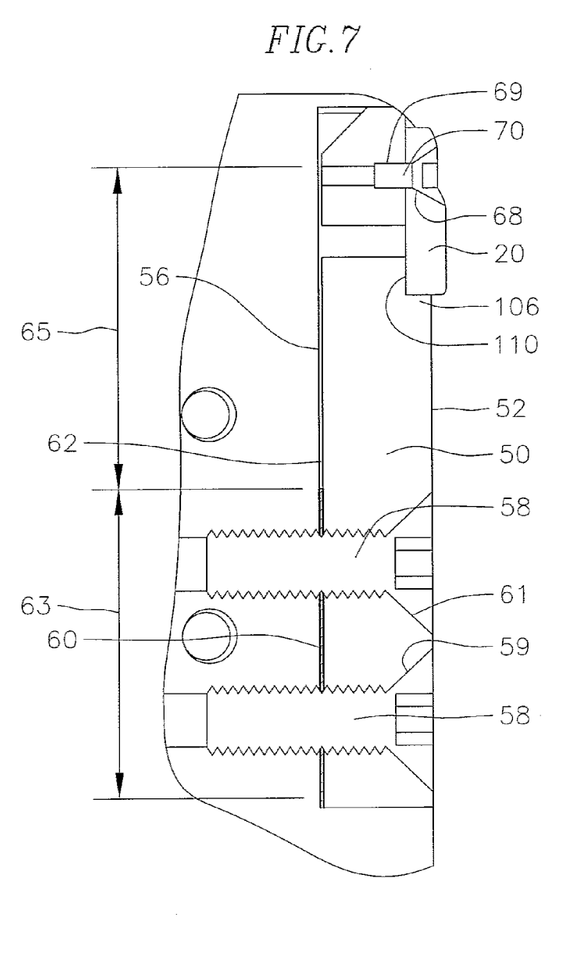
FIG. 7 is an enlarged view of detail A shown in FIG. 6.

In one exemplary embodiment, each pad is spring mounted on the bar via a cantilever beam 50 which is made from a material that can spring, as for example a high strength spring steel (FIGS. 6 and 7). The beam 50 has an outer surface 52 which is shaped to match the contour of the bar outer surface 54. A cutout 56 is formed on the bar to accommodate the beam. As shown in FIG. 7, the beam is mounted within the cut-out 56 using one or more bolts 58. The bolts 58 have counter-sunk heads 59 fitted through counter-sunk holes 61 so as to be flush with the outer surface of the beam. A shim 60 is placed between the cut-out 56 and the beam such that it is sandwiched between the bar and the beam and spans a length 63. A gap 62, spanning a length 65, thus exists above the shim such that pressure against the beam above the shim would cause the beam to spring towards the bar at least partially (and preferably not entirely) closing the gap 62. In an exemplary embodiment, the shim has a thickness on the order of about 0.01 to 0.02 inch. The pad 20 is screwed or otherwise attached to the beam 50, as for example shown in FIGS. 6, 7 and 8. In an exemplary embodiment, as shown in FIGS. 6 and 7 a screw hole 68 is positioned in the pad to accept a screw 70 which in this exemplary embodiment has counter-sunk head. The screw hole also has a countersunk portion to accept the countersunk head. In an exemplary embodiment, a threaded screw hole 69 is positioned in the beam 50 slightly closer (about 0.002 inch closer) to pad vertical and horizontal locating and support surfaces 105 and 106 defined by a pad pocket 110 in the beam (FIGS. 7 and 8), offset from what would be a perfect alignment with the countersunk screw hole 68 in the pad when the pad is in contact with pad locating and support surfaces. As a result, when the screw 70 is threaded into the threads formed on the screw hole 69 and is tightened, its tapered countersunk head pushes the pad tightly against both pad locating and support surfaces.

Figure 8:
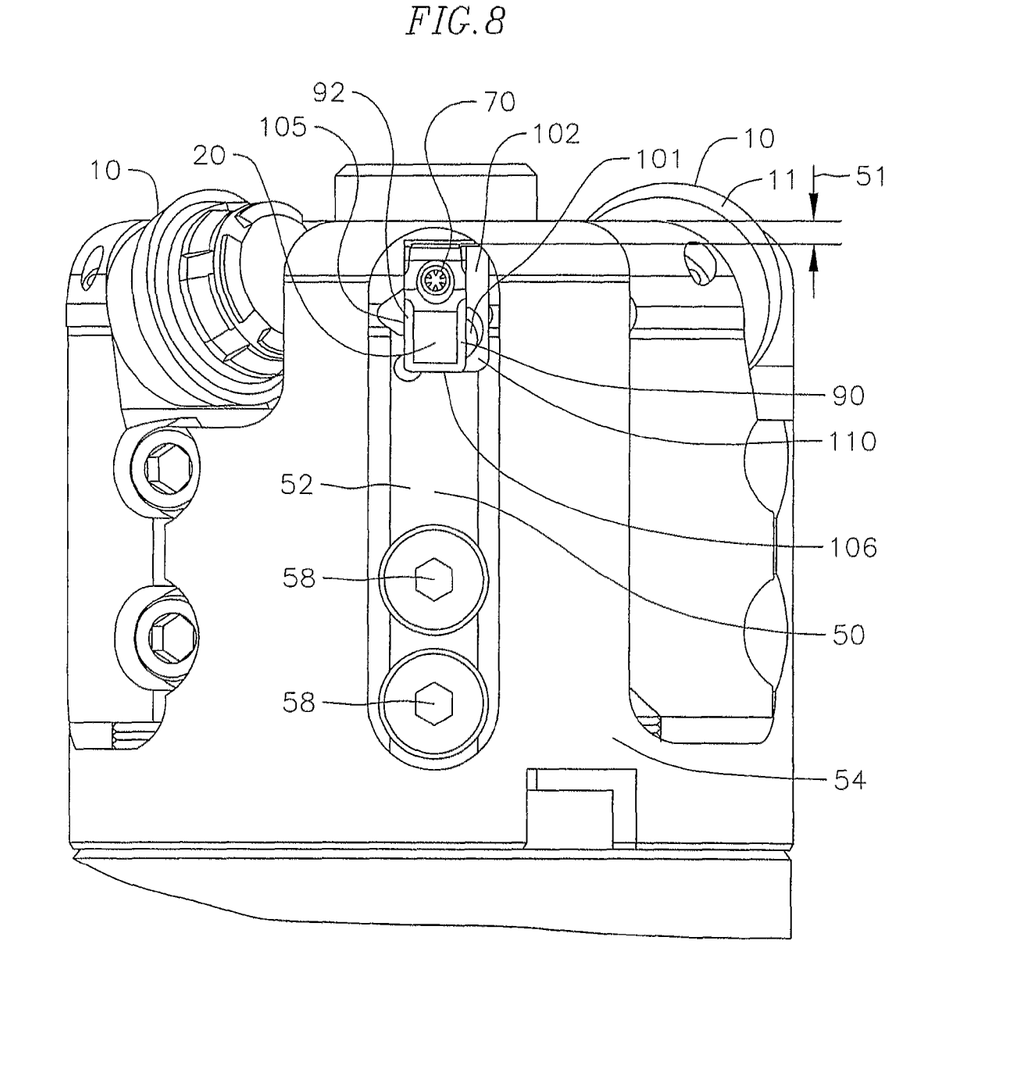
FIG. 8 is a partial front view of the exemplary embodiment boring tool shown in FIG. 6.
Figure 9:
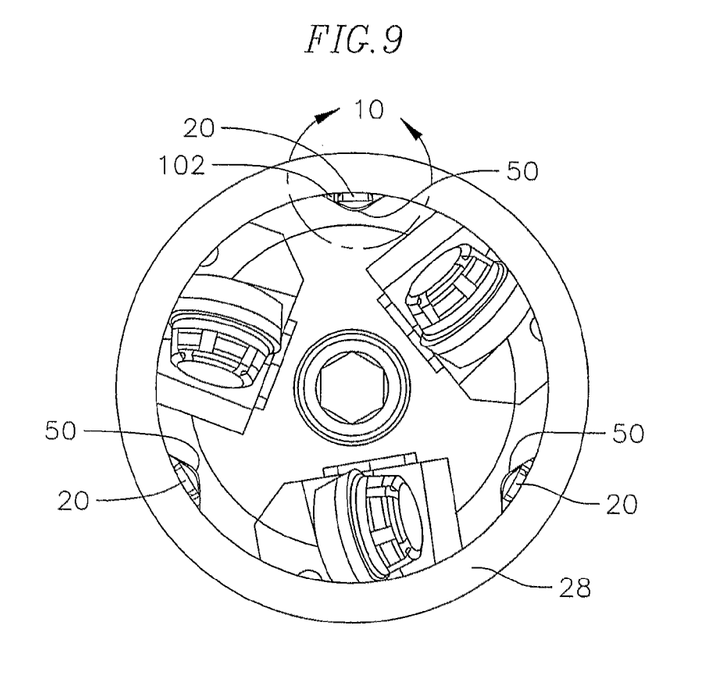
FIG. 9 is a top end view of the boring tool shown in FIG. 8.
Figure 10:
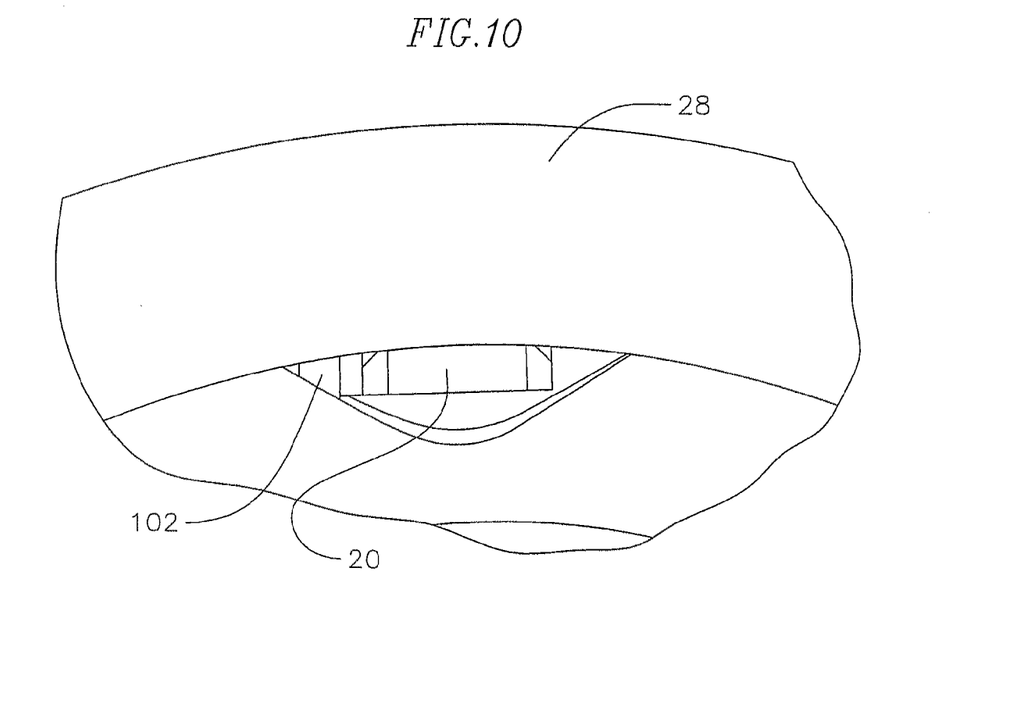
FIG. 10 is an enlarged view of the detail A shown in FIG. 9

Shown in FIG. 8 is a coolant delivery passage 101 formed in the beam 50. This embodiment allows through-spindle coolant that is routed through the bar into the cutout 56 and behind the beam 50 to exit just ahead (circumferentially) of the pad to provide localized cooling and lubrication of the pad. An added bonus of this embodiment is the coolant, having to flow somewhere after progressing through coolant delivery hole 101, is directed ahead of the bar via coolant exhaust channel 102 that can be seen in FIGS. 8, 9 and 10. This flow of coolant serves to flush chips of removed material axially ahead of and out of the way of the boring bar which is favorable in general and specifically for this stabilization approach so as to avoid chips getting caught between the pads and finished bore wall, which could damage the finished bore wall and/or the pads. This is particularly important on boring machines where the boring bar and drive spindle are oriented horizontally in which case gravity does not assist in removing chips as is the case when the boring bar and drive spindle are oriented vertically with gravity.

When initially boring through the cylindrical work piece 28 using the boring tool 8, the dimensions of the bar having pads on beams are such that the contact of each pad with the inner surface of the cylindrical work piece causes its corresponding beam to flex against the bar to at least partially, but not entirely, close the gap 62 as it enters the work piece. The spring force generated by the closing of the gap by the flexing beam generates a spring force attempting to open the gap, thus pushing the pad against the inner surface of the cylindrical work piece. In this regard, as the main contact portion 40 of the pad wears, the spring force generated by the beam would cause the pad to maintain engagement with the finished bore of the work piece while maintaining the gap 42 between the bull nose outer surface 36 and the lead-tooth cut profile 22 on the work piece, thus preventing chatter.

Figures 11, 12:
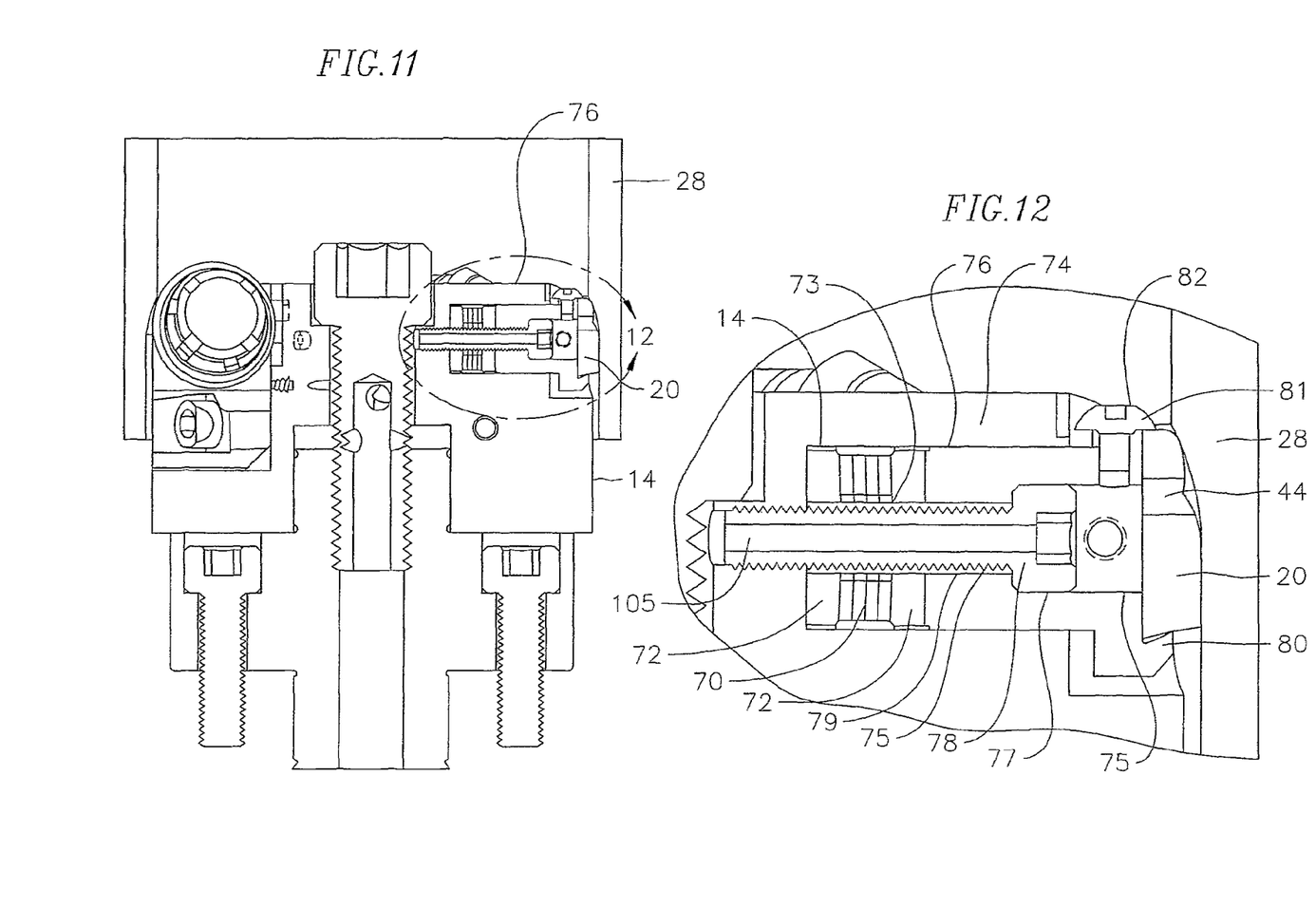
FIG. 11 is a partial cross-sectional view of another exemplary embodiment boring tool end section of the present invention.
FIG. 12 is an enlarged view of the detail A shown in FIG. 11.
Figure 13:
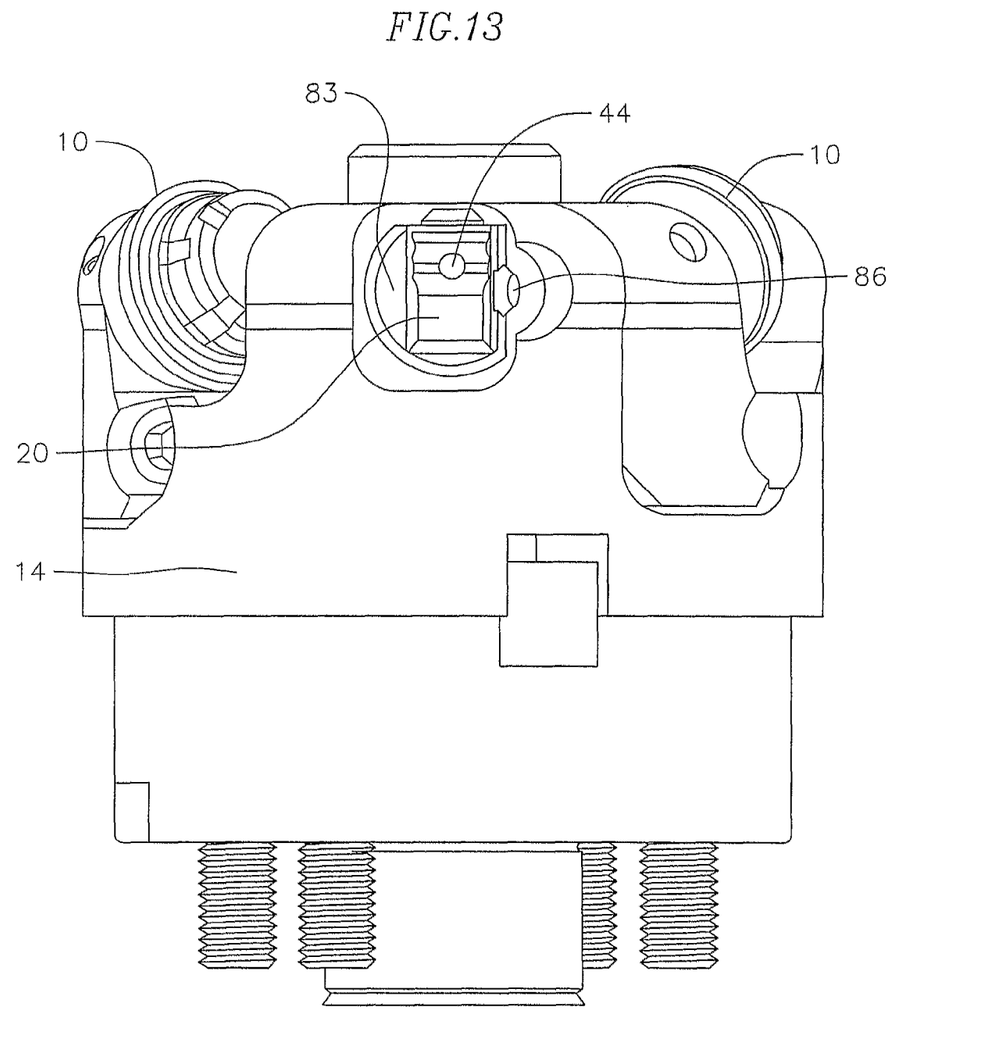
FIG. 13 is a front view of the boring tool end section shown in FIG. 11.

In another exemplary embodiment, each pad is mounted onto the bar 14, as shown in FIGS. 11, 12, and 13 via a plunger type installation. In this embodiment, a spring pack 70, which in an exemplary embodiment includes a plurality of belleville washers, is sandwiched between hardened spring seats 72. A bolt 78 coupled to a pad support 74 is fitted through a bore 75 (which is stepped from a larger diameter section 77 to a smaller diameter section 79) in the pad support and through a central bore 73 defined through the hardened spring seats 72 and the spring pack 70 and is threaded or otherwise fastened to the bar 14. An opening 76 is formed in the bar 14 to accommodate the pad support as well as the hardened spring seats and the spring pack. In the shown exemplary embodiment, the bolt 78 is threaded onto the body of the bar 14 until the pad support exerts some preload force against the hardened spring seats and the spring pack. The bolt 78 slides within the bore through the spring seats and the spring pack. The pad 20 is attached at an end of the pad support. The pad support forms a seat 80 to allow for seating of the pad 20 thereto (FIG. 12). A fastener 82 is threaded onto the pad support from a section opposite the seat 80, such that the head 81 of the screw urges the pad 20 against the seat 80 for retaining the support into position. A similar second seat 83 (FIG. 13) is formed generally perpendicular to the seat 80. Another fastener, such as fastener 86, is used to clamp the side of the pad against the seat 83. In the shown exemplary embodiment, bolt 78 has a coolant passage 105 through its center. Through-spindle coolant passes through such passage 105 and through passage 44 in the pad to provide localized cooling and lubrication to the pad. With this exemplary embodiment, as the bar with teeth enters the cylindrical work piece 28, the bull nose portion of the pad engages the inner surface of the cylindrical work piece, causing the pad to urge the pad support to move against the spring seats and the spring pack (thus defining a plunger), causing the spring pack to compress and to exert a force in an opposite direction for retaining the pad engaged against the inner surface of the cylindrical work piece 28. Either of these exemplary embodiment spring mounted pads reduce or alleviate chatter.

Figure 1:
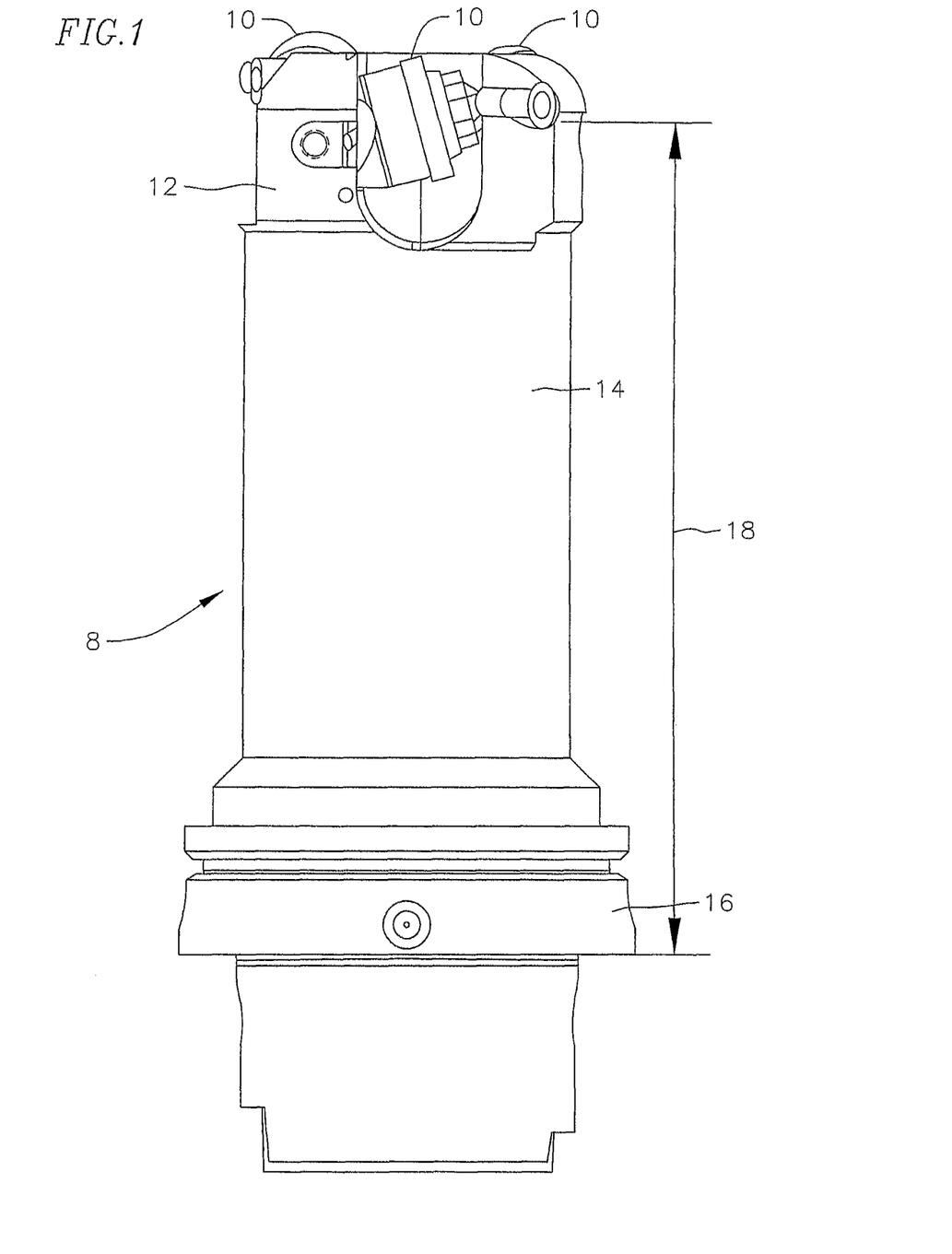
FIG. 1 is a front view of a boring tool.
Figure 2:
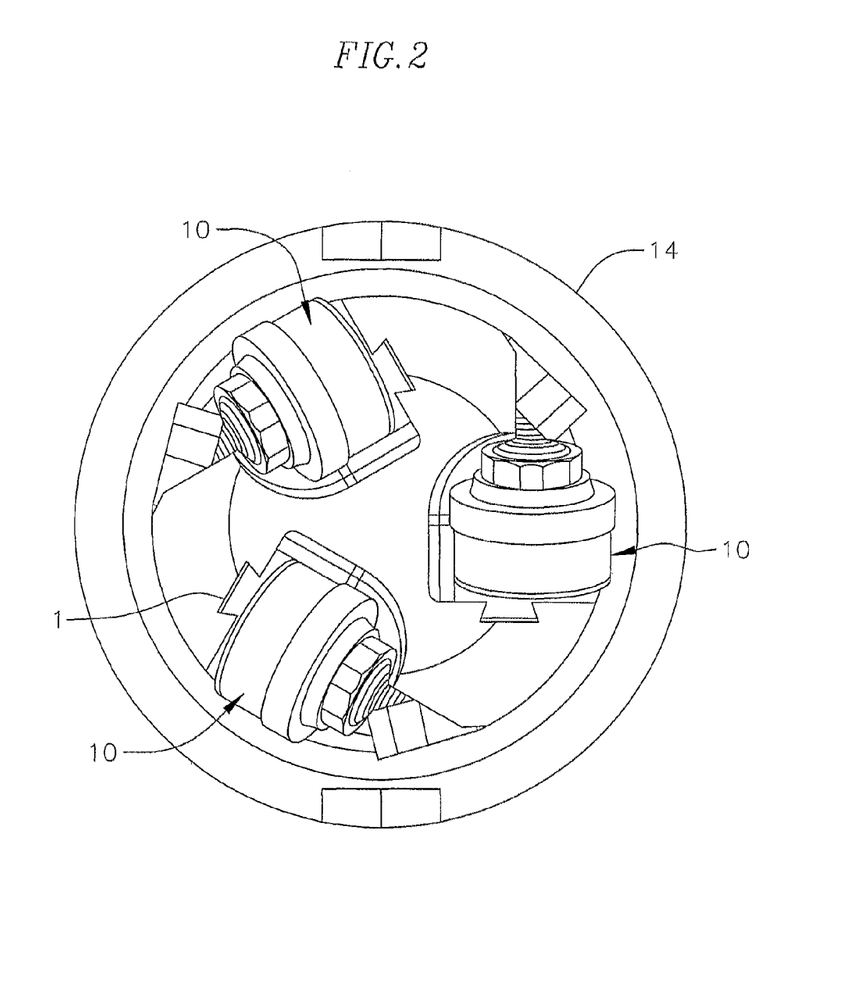
FIG. 2 is a top end view of the boring tool shown in FIG. 1.

It should be noted that the bar can be a single section bar, as for example shown in FIG. 1 or may be made from multiple sections such as a bottom section onto which is mounted a top section, as for example shown in FIG. 6.

Although the present invention has been described and illustrated with respect to exemplary embodiments, it is to be understood that it is not to be so limited, since changes and modifications may be made therein, which are within the full intended scope of this invention as hereinafter claimed.

What is claimed is:

1. A boring tool comprising:
a body having a longitudinal axis;
a cutting element mounted to the body at a location radially from said longitudinal axis; and
a pad mounted to said body for stabilizing said tool during boring, said pad extending radially from said body and being sprung relative to said body along a radial direction, said pad being spaced apart from said cutting element and comprising:
a first section comprising a bull nose outer surface,
a second section adjacent the first section, and
a third section adjacent the second section, wherein the third section comprises an outer surface that extends radially beyond the first section and wherein the second section has an outer surface defining a transition from the first section to the third section outer surface.

2. The boring tool as recited in claim 1, wherein during boring of an object with said boring tool a lead-tooth cut profile is defined in said object having a first maximum diameter, an intermediate-tooth cut profile is defined in said object adjacent to said lead-tooth cut profile, said intermediate-tooth cut profile having a second maximum diameter which is greater than or equal to the first maximum diameter and a finish-tooth cut profile is defined in said object adjacent to said intermediate-tooth cut profile, said finish-tooth cut profile having a third maximum diameter which is greater than or equal to the second maximum diameter, wherein said finish-tooth cut profile is adjacent to a finished bored section formed in said object having said third maximum diameter, wherein the third section outer surface is for engaging said finished bored section causing a gap to form between said bull nose outer surface and said lead-tooth cut profile.

3. The boring tool as recited in claim 1, wherein a bore penetrates through the entire second section of the pad.

4. The boring tool as recited in claim 1, comprising at least three cutting elements and at least three pads, each pad being individually spring mounted relative to said body along a radial direction.

5. The boring tool as recited in claim 1, comprising:
a shim;
a beam mounted on the body and over the shim, wherein a portion of the beam extends beyond the shim defining a gap with the body, wherein the pad is mounted on said beam, and wherein said beam can flex to close said gap for allowing said pad to be sprung relative to said body along said radial direction.

6. The boring tool as recited in claim 5, wherein the beam comprises a spring steel.

7. The boring tool as recited in claim 5, wherein the beam is mounted in a cutout formed on said body.

8. The boring tool as recited in claim 1, further comprising:
a spring pack;
a support body; and
a fastener fastened through the support body to the tool body, said fastener penetrating the spring pack, wherein the pad is mounted on said support body for allowing said pad to be sprung relative to said body along said radial direction.

9. The boring tool as recited in claim 8, wherein said spring pack comprises a plurality of belleville washers.

10. The boring tool as recited in claim 8, wherein said support body comprises at least one seat, and at least one fastener, wherein the pad is seated on said at least one seat and is urged in place against said at least one seat by said at least one fastener.

11. The boring tool as recited in claim 1, comprising:
a spring pack;
a support body; and
a fastener fastened through the support body to the tool body, said fastener penetrating the spring pack, wherein the pad is mounted on said support body.

12. The boring tool as recited in claim 11, wherein said spring pack comprises a plurality of belleville washers.

13. The boring tool as recited in claim 11, wherein said support body comprises at least one seat, and at least one fastener, wherein the pad is seated on said at least one seat and is urged in place against said at least one seat by said at least one fastener.

14. A boring tool comprising:
a body;
a cutting element mounted to the body;
a shim;
a beam mounted on the body and over the shim, wherein a portion of the beam extends beyond the shim defining a gap with the body; and
a pad mounted to said beam for stabilizing said tool during boring, said pad being spaced apart from said cutting element and comprising:
a first section comprising a bull nose outer surface,
a second section adjacent the first section, and
a third section adjacent the second section, wherein the third section comprises an outer surface that extends radially beyond the first section and wherein the second section has an outer surface defining a transition from the first section to the third section outer surface.

15. The boring tool as recited in claim 14, wherein the beam comprises a spring steel.

16. The boring tool as recited in claim 15, wherein the beam is mounted in a cutout formed on said body.

17. The boring tool as recited in claim 14, wherein said shim is separate from said body and said beam.

18. A boring tool comprising:
a body having a longitudinal axis;
a cutting element mounted to the body at a location radially from said longitudinal axis; and
a pad mounted to said body, said pad extending radially from said body and being sprung relative to said body along a radial direction, wherein the pad comprises,
a first section comprising a bull nose outer surface,
a second section adjacent the first section, and
a third section adjacent the second section, wherein the third section comprises an outer surface that extends radially beyond the first section and wherein the second section has an outer surface defining a transition from the first section to the third section outer surface.

19. The boring tool as recited in claim 18, wherein a bore penetrates through the entire second section of the pad.

20. The boring tool as recited in claim 18, wherein during boring of an object with said boring tool a lead-tooth cut profile is defined in said object having a first maximum diameter, an intermediate-tooth cut profile is defined in said object adjacent to said lead-tooth cut profile, said intermediate-tooth cut profile having a second maximum diameter which is greater than or equal to the first maximum diameter and a finish-tooth cut profile is defined in said object adjacent to said intermediate-tooth cut profile having a third maximum diameter which is greater than or equal to the second maximum diameter, wherein said finish-tooth cut profile is adjacent to a finished bored section formed in said object having said third maximum diameter, wherein the third section outer surface is for engaging said finished bored section causing a gap to form between said bull nose outer surface and said lead-tooth cut profile.

21. A boring tool comprising:
a body;
a cutting element mounted to the body;
a pad mounted to said body for stabilizing said tool during boring, said pad being spaced apart from said cutting element and comprising:
a first section comprising a bull nose outer surface,
a second section adjacent the first section, and
a third section adjacent the second section, wherein the third section comprises an outer surface that extends radially beyond the first section and wherein the second section has an outer surface defining a transition from the first section to the third section outer surface;
a spring pack;
a support body; and
a fastener fastened through the support body to the tool body, said fastener penetrating the spring pack, wherein the pad is mounted on said support body, wherein said support body comprises at least one seat, and at least one fastener, wherein the pad is seated on said at least one seat and is urged in place against said at least one seat by said at least one fastener.

22. The boring tool as recited in claim 21, wherein said spring pack comprises a plurality of belleville washers.

* * * * *